United States Patent
Lewis

(10) Patent No.: US 9,101,096 B1
(45) Date of Patent: *Aug. 11, 2015

(54) SEMI-AUTOMATED CROP PRODUCTION SYSTEM

(71) Applicant: Myles D. Lewis, Tucson, AZ (US)

(72) Inventor: Myles D. Lewis, Tucson, AZ (US)

( * ) Notice: Subject to any disclaimer, the term of this patent is extended or adjusted under 35 U.S.C. 154(b) by 144 days.

This patent is subject to a terminal disclaimer.

(21) Appl. No.: 13/902,902

(22) Filed: May 27, 2013

Related U.S. Application Data

(63) Continuation-in-part of application No. 13/070,407, filed on Mar. 23, 2011, now Pat. No. 8,468,741.

(60) Provisional application No. 61/316,777, filed on Mar. 23, 2010.

(51) Int. Cl.
*A01G 9/14* (2006.01)
*A01G 9/24* (2006.01)

(52) U.S. Cl.
CPC .. *A01G 9/14* (2013.01); *A01G 9/24* (2013.01); *A01G 9/243* (2013.01); *A01G 9/247* (2013.01)

(58) Field of Classification Search
USPC ....... 47/17, 21.1, 48.5, 58.1 LS, 66.6, 39, 44, 47/46
See application file for complete search history.

(56) References Cited

U.S. PATENT DOCUMENTS

| | | | |
|---|---|---|---|
| 4,091,566 A * | 5/1978 | Horvath et al. | 47/17 |
| 4,163,342 A * | 8/1979 | Fogg et al. | 47/58.1 R |
| 4,799,858 A | 1/1989 | Shin-Chin | |
| 4,914,858 A | 4/1990 | Nijssen et al. | |
| 5,012,609 A | 5/1991 | Ignatius et al. | |
| 5,101,593 A | 4/1992 | Bhatt | |
| 5,111,612 A | 5/1992 | Takishima et al. | |
| 5,299,383 A | 4/1994 | Takakura | |
| 5,833,293 A | 11/1998 | Ludwig | |
| 6,382,418 B1 * | 5/2002 | Weder | 206/423 |
| 6,508,033 B2 | 1/2003 | Hessel et al. | |
| 6,554,450 B2 | 4/2003 | Fang et al. | |
| 7,160,717 B2 | 1/2007 | Everett | |
| 7,975,429 B2 | 7/2011 | Okabe et al. | |
| 8,234,812 B1 | 8/2012 | Colless et al. | |
| 2008/0008812 A1 * | 1/2008 | Ochiai et al. | 426/542 |
| 2008/0216398 A1 | 9/2008 | Townsley | |
| 2008/0295400 A1 | 12/2008 | Harwood et al. | |
| 2010/0018131 A1 | 1/2010 | Green | |
| 2011/0041415 A1 | 2/2011 | Esposito | |
| 2012/0120658 A1 | 5/2012 | Wilk | |
| 2012/0170263 A1 | 7/2012 | Rodriguez | |
| 2012/0210640 A1 * | 8/2012 | Ivanovic | 47/58.1 LS |
| 2013/0263503 A1 * | 10/2013 | Bostdorff | 47/58.1 LS |

FOREIGN PATENT DOCUMENTS

WO    WO 2009119778    * 10/2009

* cited by examiner

*Primary Examiner* — David Parsley
*Assistant Examiner* — Magdalena Topolski

(57) ABSTRACT

A semi-automated crop production system featuring a growing module with grids of cells for growing plants and a lighting and airflow fixture positioned above each cell. The lighting and airflow fixtures feature a fan disposed in a housing, a light emitting diode (LED) assembly board comprising LEDs disposed below the fan; a light diffuser disposed below the LED assembly board, and an adjustable airflow nozzle extending downwardly from the fan and protruding through the LED assembly board and the light diffuser. The adjustable airflow nozzle provides directed airflow downwardly toward a bottom area of the housing. The growing module and lighting and airflow fixtures are housed in a shell. The growing module may be slidably attached to the interior wall of the shell via mounting components.

13 Claims, 7 Drawing Sheets

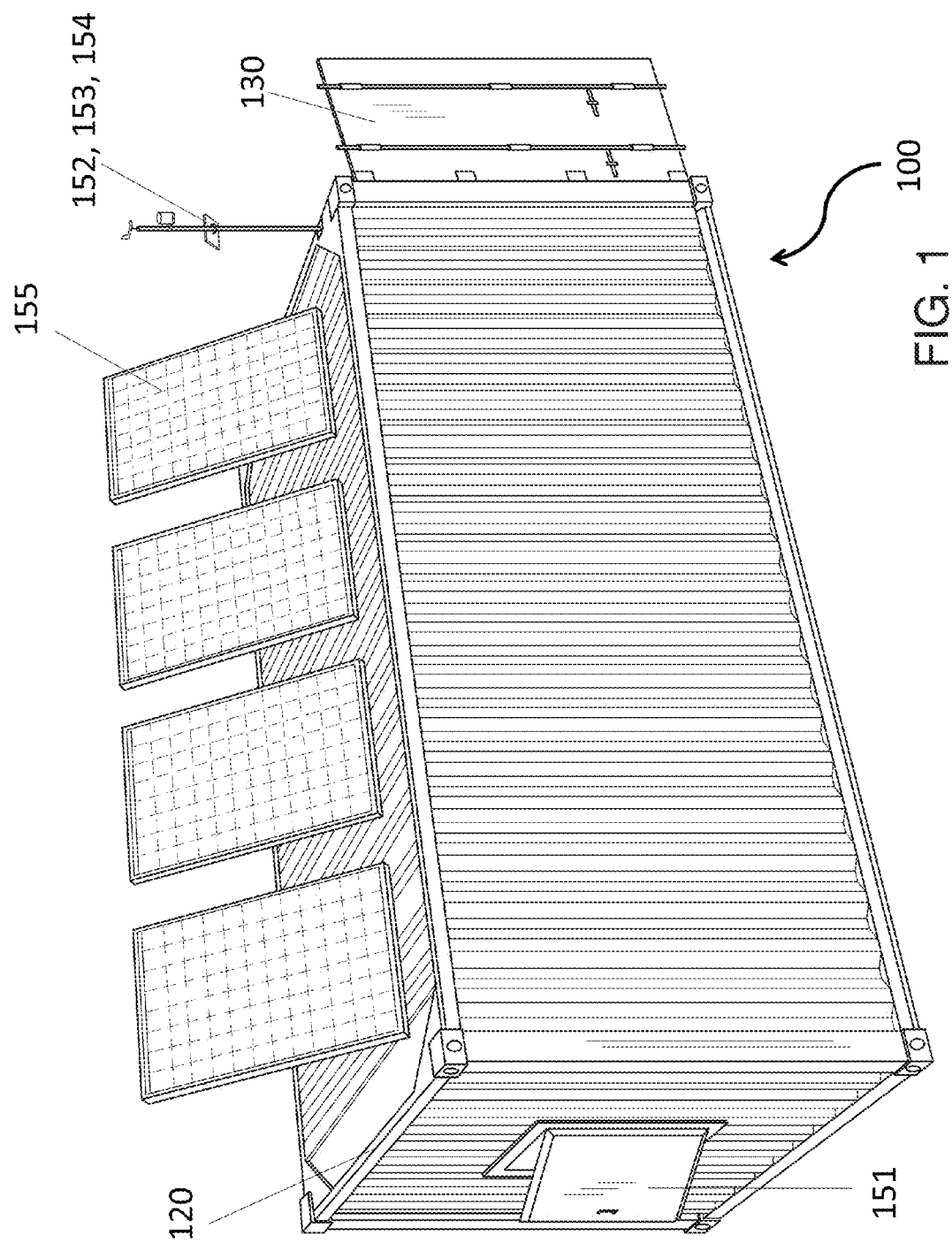

AIR FLOW

SEMI-AUTOMATED CROP PRODUCTION SYSTEM

CROSS REFERENCE

The present application is a continuation-in-part of U.S. patent application Ser. No. 13/070,407 filed Mar. 23, 2011, which claims priority to U.S. Provisional Patent Application Ser. No. 61/316,777, filed Mar. 23, 2010, the disclosures of which are incorporated in their entirety herein by reference.

FIELD OF THE INVENTION

The present invention is directed to agriculture systems, more particularly to a self-contained semi automated production facility capable of culturing plants and other organisms in a controlled environment. The present invention is in no way limited to the examples disclosed herein.

BACKGROUND OF THE INVENTION

As population continues to grow, more land is required for habitation and more food is required for consumption. To accommodate growing urbanization and the decrease of arable land area, agricultural systems are centralizing to hotspots within the U.S. and other countries. However, these large-scale production systems may use inefficient methods, and some systems may select fruits and vegetables for their ability to be harvested early and transport for extended periods of time as opposed to being selected for good nutritional content. The increase use of transplants is needed to support the increase in farming for the rising population. Some consumers may wish to engage in supporting or growing locally produced foods for increased quality, nutrition and lower price. However, many cities lack the zoning laws to address small-scale agricultural operations. The present invention features a self-contained semi-automated production facility capable of culturing plants and other organisms in a controlled environment. The system of the present invention provides optimal environmental conditions, regardless of the external conditions, to allow for production of such plants and organisms. The system provides treatments for manipulation of the physiology, morphology, or other phenotypical responses. The system provides environments for grafted plant production including germination, healing, and cultivation. The system of the present invention helps to use better technologies to produce food (and other plant products such as biopharmaceuticals, industrials compounds, etc. in a controlled and scalable manner), rather than the traditional methods. The present invention is in no way limited to the examples disclosed herein.

For example, in some embodiments, the system is used for the enhancement of nutritional content of food products produced. Adding nutritional content and placement may help to alleviate localized food-related health issues by contributing to availability of high quality, high nutrition, foods that are normally inaccessible in such areas.

Sometimes the readiness of the accepting planting location may not be suitable due to unfavorable weather conditions, poor field conditions (e.g., a wet field), operator readiness (business, or lack of adequate plant stock), or other issue and planting must be delayed. During such time, transplants will experience unfavorable conditions in their non-climate controlled, non-irrigated, passive transportation container as they wait for transplant. As a result of waiting in poor conditions, loss of units and/or plant quality occurs. Loss of quality will be expressed in the field by lower yield and quality. The present invention creates an intermittent storage facility to help avoid potential risks and losses.

Similarly, sometimes transplants are traveling from ideal or different conditions as compared to those of their final destination. This difference in climatic condition can shock the plants if not properly acclimated beforehand. This can cause loss of units, yield, and quality. In some embodiments, the system of the present invention can provide optimal growth conditions and low temperature storage of plants without needing internment or specialized facilities such as refrigerated storage, which is not commonly used for vegetable plant stock storage. The system of the present invention can be left at the transplanting location desired while maintaining plant stock in a preserved condition until the plant stock is needed for use or the conditions are appropriate. Preserved and ready-to-use, in-production, or in-transit plant stocks may be acclimated to current or anticipated field conditions when desired using the present system, offering greater initial survival rates, higher quality and yield as a result of a healthier organism entering the field.

The system of the present invention may also be suitable for disaster relief. For example, the system of the present invention may be primed with starting materials (or be already in production) and then transported to the needed location. During transport, products may be growing, allowing for readiness upon arrival or reduced time to readiness, with the capacity for continued production immediately upon arrival. In some embodiments, the system of the present invention allows for food production in non-traditional locations such as disaster relief areas or similar where infrastructure to support food production would be useful. The system of the present invention may also be utilized passively or actively for water treatment. Through the application of brackish or otherwise untreated water to organisms growing in the system, transpiration of the water into a gaseous form will occur during photosynthesis and respiration retaining harmful components within the plant, growing substrate, or recirculated solution. The condensate recovery system and the water treatment and filtration systems may be used to collect, sterilize and create potable water from otherwise unusable sources after being collected from recirculated moist air within the unit.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description.

SUMMARY

The present invention features a semi-automated crop production system (100). In some embodiments, the system (100) comprises a growing module (200) featuring a growing module container (210) and a grid (220) disposed inside the growing module container (210). The system (100) may alternatively feature an insulated container without the growing module insert or the growing module insert without containment (e.g., the growing module container (210) without the shell (120)).

The grid (220) comprises a plurality of cells (230) adapted to hold a plant. For example, the grid (220)/cells (230) can hold a series of plants (e.g., a series of tomato plants) in buckets on a single plane independent of each other.

In some embodiments, the system (100) comprises a plurality of lighting and airflow fixtures (300). The lighting and airflow fixtures (300) may be disposed inside the growing module container (210) and positioned above the grid (220). For example, the lighting and airflow fixtures (300) may be mounted to the growing module container (210), or in some embodiments, the lighting and airflow fixtures (300) may be mounted to the shell (110/120). The lighting and airflow fixtures (300) are not limited to the configurations described herein and may include other contained light sources, e.g., a high intensity discharge (HID) lamp.

Each lighting and airflow fixture (300) features a housing (310); a fan (320) disposed in the housing (310) and positioned to blow air downwardly; a light emitting diode (LED) assembly board (330) comprising LEDs (332) (or other light system such as OLED, etc.) disposed below the fan (320) in the housing (310); a light diffuser (340) disposed below the LED assembly board (330); and an adjustable airflow nozzle (350) extending downwardly from the fan (320) and protruding through the LED assembly board (330) and the light diffuser (340). The light diffuser (340) comprises airflow orifices (342). The adjustable airflow nozzle (350) provides directed airflow downwardly toward a bottom area of the housing (310). The plurality of lighting and airflow fixtures (300) are arranged such that each lighting and airflow fixture (300) is positioned above a cell (230) and air flow from the fan (320) and light from the LEDs (332) of the lighting and airflow fixture (300) is directed downwardly towards its respective cell (230).

The lighting and airflow fixtures (300) of the present invention are not limited to merely providing light and airflow. In some embodiments, the lighting and airflow fixtures (300) of the present invention provide direct injection of temperature-controlled air, $CO_2$, or other features.

In some embodiments, the growing module slidably engages a mounting component (140) disposed in a wall of an interior shell (110). In some embodiments, the mounting component (140) is disposed in a side wall (112) of the interior shell (110). In some embodiments, a mounting component flange (142) is disposed on the growing module container (210); the mounting component flange (142) slidably engages the mounting component (140) of the shell (110). In some embodiments, the interior shell (110) is slidably disposed in an exterior shell (120). This can include the incorporation of free-standing plants or series of tables of plants.

In some embodiments, the system (100) features an air filtration system. For example, in some embodiments, the system (100) features an air scrubber with a HEPA-type filter or other filter for particulates, microbes, certain viruses etc. In some embodiments, the air filtration system also incorporates UV sterilization of the air followed by scrubbing to remove any number of contaminants or components of the air, e.g., ethylene produced by organisms, $CO_2$, $O_2$, NOX and VOX, Cl— and other chemicals that may outgas or be released.

In some embodiments, the semi-automated crop production system (100) further comprises an internal irrigation system (400) for continuous recirculation of water through the growing module (200). In some embodiments, the irrigation system (400) features irrigation with load cells (or tensiometers or other devices) under the growing modules to determine water consumption by plants, sap flow, organism color, temperature, morphology, etc. The internal irrigation system (400) connects to an inlet connection (410) and an outlet connection (420) disposed in the growing module container (210).

In some embodiments, the semi-automated crop production system (100) further comprises a sterilizing system (450) for sterilizing water of the internal irrigation system (400). The sterilizing system (450) may filter water with mesh/screen filters, sand/other stone filters, activated carbon, ion-exchange resin, ion selective membranes, distillation, or other filters or systems. The filters or other systems may remove particulate matter, microbes, and organic acids and other growth-inhibiting substances produced by organisms. In some embodiments, the sterilizing system (450) comprises a sterilizing lamp, an anti-microbial light, a UV-sterilizing system, a chemical sterilizing system, or an ozone system.

In some embodiments, the semi-automated crop production system (100) further comprises boom system (500), wherein the boom system (500) comprises an X/Y track (502) along an X/Y direction and a Z track (501) along a Z direction, and a moveable boom (503) that can move along the X/Y direction (502) and the Z direction (501). The boom system (500) provides a horticultural function (e.g., irrigation, fertilization, air ducting, vacuum creation, lighting, or contacting). In some embodiments, the boom system (500) further comprises a data acquisition system (504) comprising sensors and cameras, wherein the sensors and cameras are mounted on the moveable boom (503) or on the X/Y track (502) or Z track (501).

The present invention also features a semi-automated crop production system (100) comprising (a) a growing module (200) comprising a growing module container (210), a grid (220) disposed inside the growing module container (210), the grid (220) comprises a plurality of cells (230) adapted to hold a plant; (b) an internal irrigation system (400) for continuous recirculation of water through the growing module (200), the internal irrigation system (400) connects to an inlet connection (410) and an outlet connection (420) disposed in the growing module container (210); and (c) a boom system (500), the boom system (500) comprises an X/Y track (502) along an X/Y direction and a Z track (501) along a Z direction, and a moveable boom (503) that can move along the X/Y direction (502) and the Z direction (501), the boom system (500) provides a horticultural function. The growing module (200), irrigation system (400), and boom system (500) may be housed in a shell (110).

In some embodiments, the horticultural function comprises irrigation, fertilization, air ducting, vacuum creation, lighting, or contacting. In some embodiments, the boom system (500) further comprises a data acquisition system (504) comprising sensors and cameras, the sensors and cameras are mounted on the moveable boom (503) or on the X/Y track (502) or Z track (501). In some embodiments, the semi-automated crop production system (100) further comprises a coating disposed on the shell (110), the coating is chemically resistant and waterproof. In some embodiments, the coating is impregnated with anti-microbial/viral/bacterial element.

BRIEF DESCRIPTION OF THE DRAWINGS

FIG. 1 is a perspective view of the system of the present invention.

DESCRIPTION OF PREFERRED EMBODIMENTS

The following is a listing of numbers corresponding to particular elements referred to herein. The present invention is not limited to the described examples, components, and configurations.

Figure 1A:
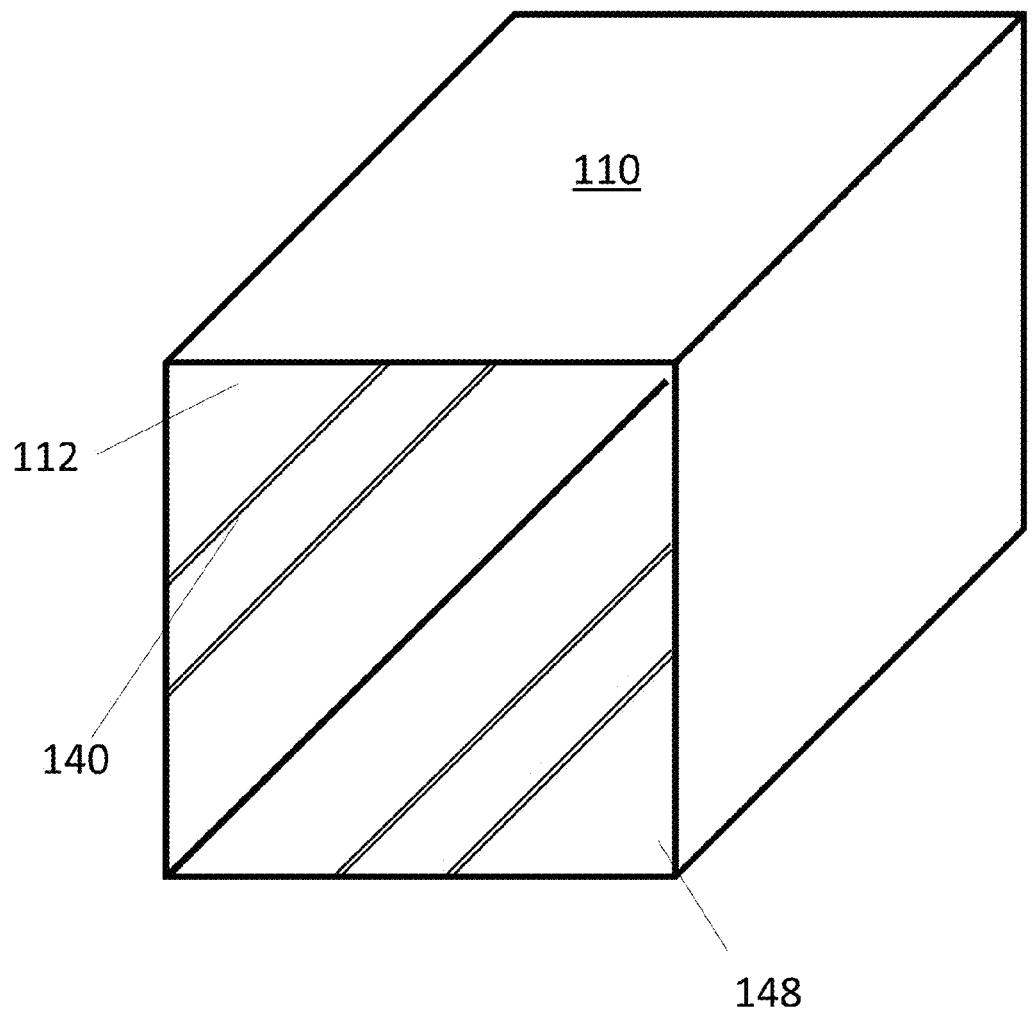
FIG. 1A is an internal view of the system of the present invention showing the inner shell and mounting components.
Figure 2:
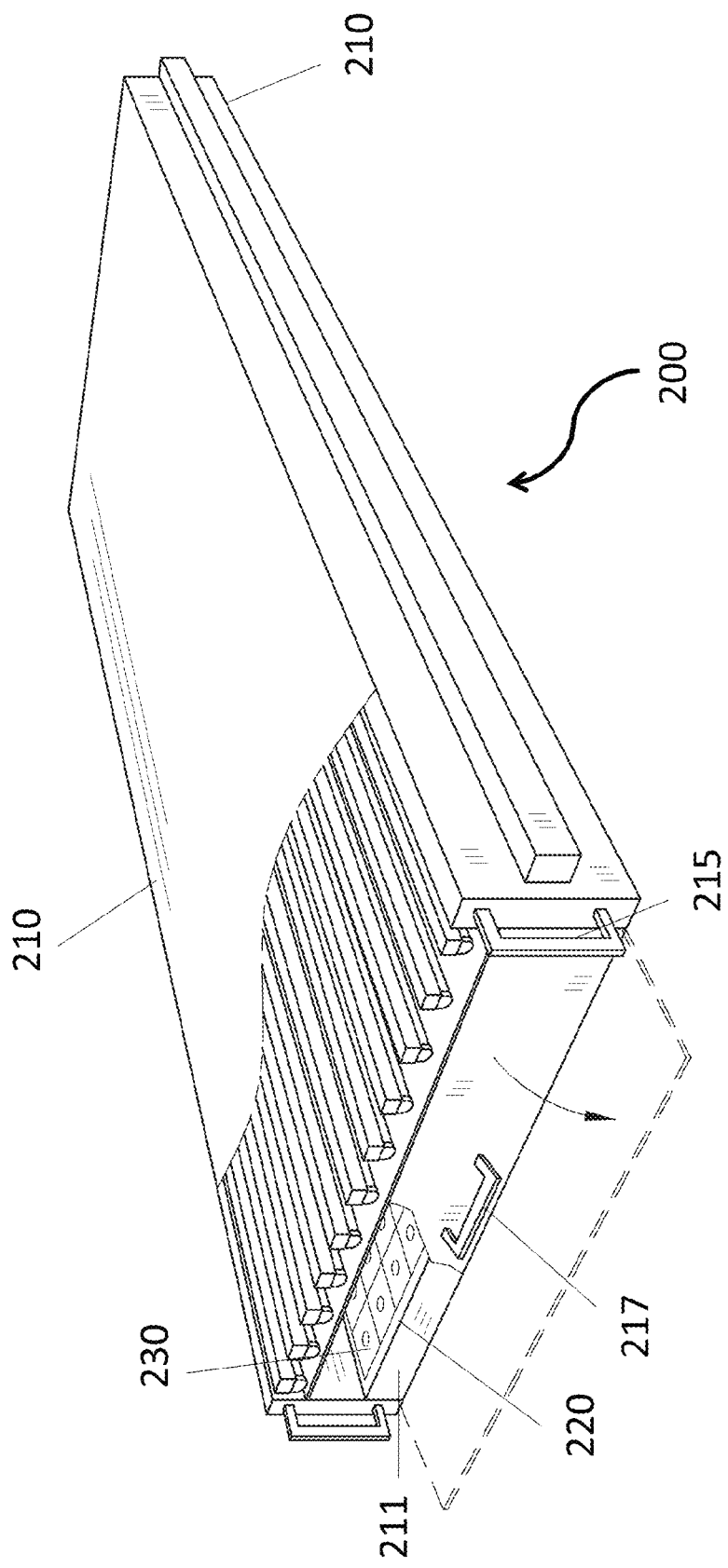
FIG. 2 is a perspective view of the growing module of the present invention.
Figure 3:
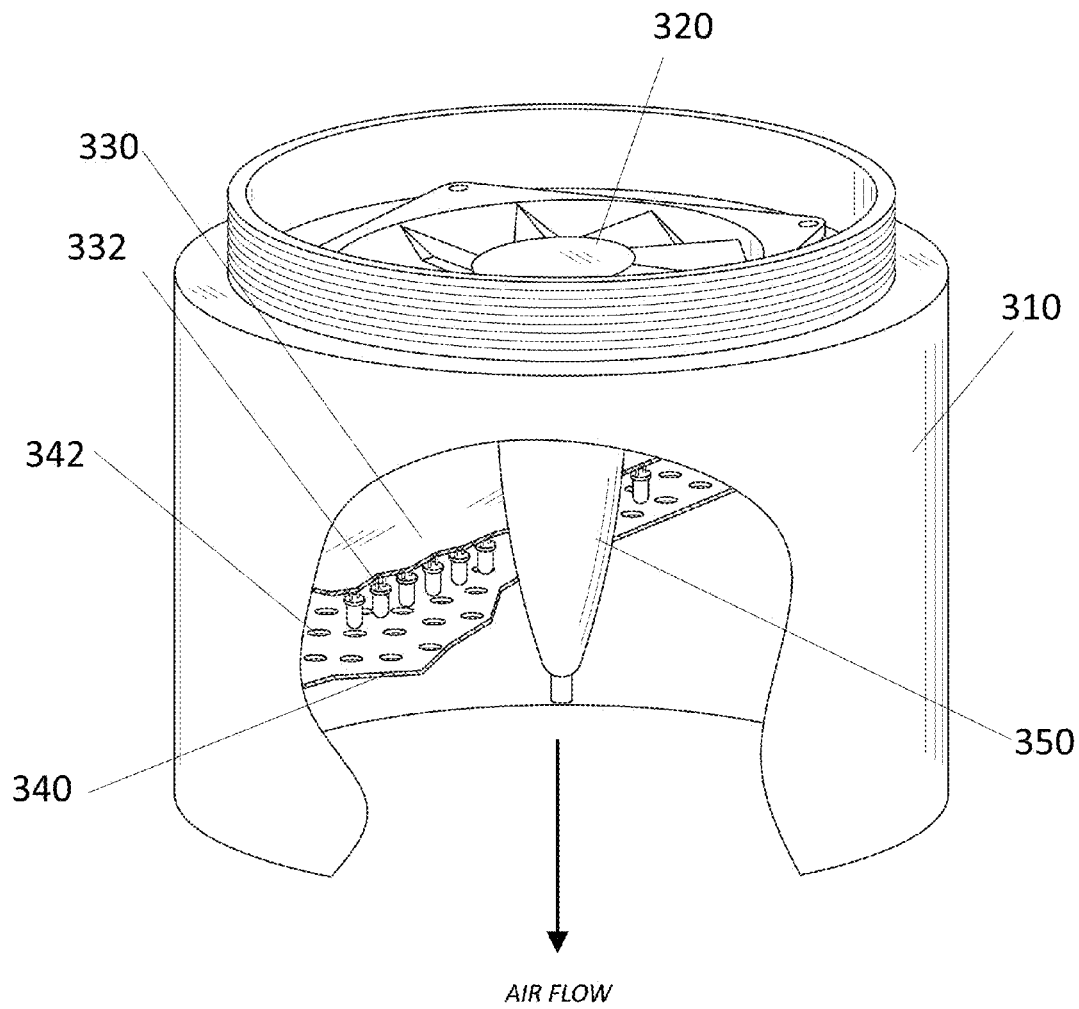
FIG. 3 is a perspective and internal view of the light and airflow fixture of the present invention.
Figure 4:
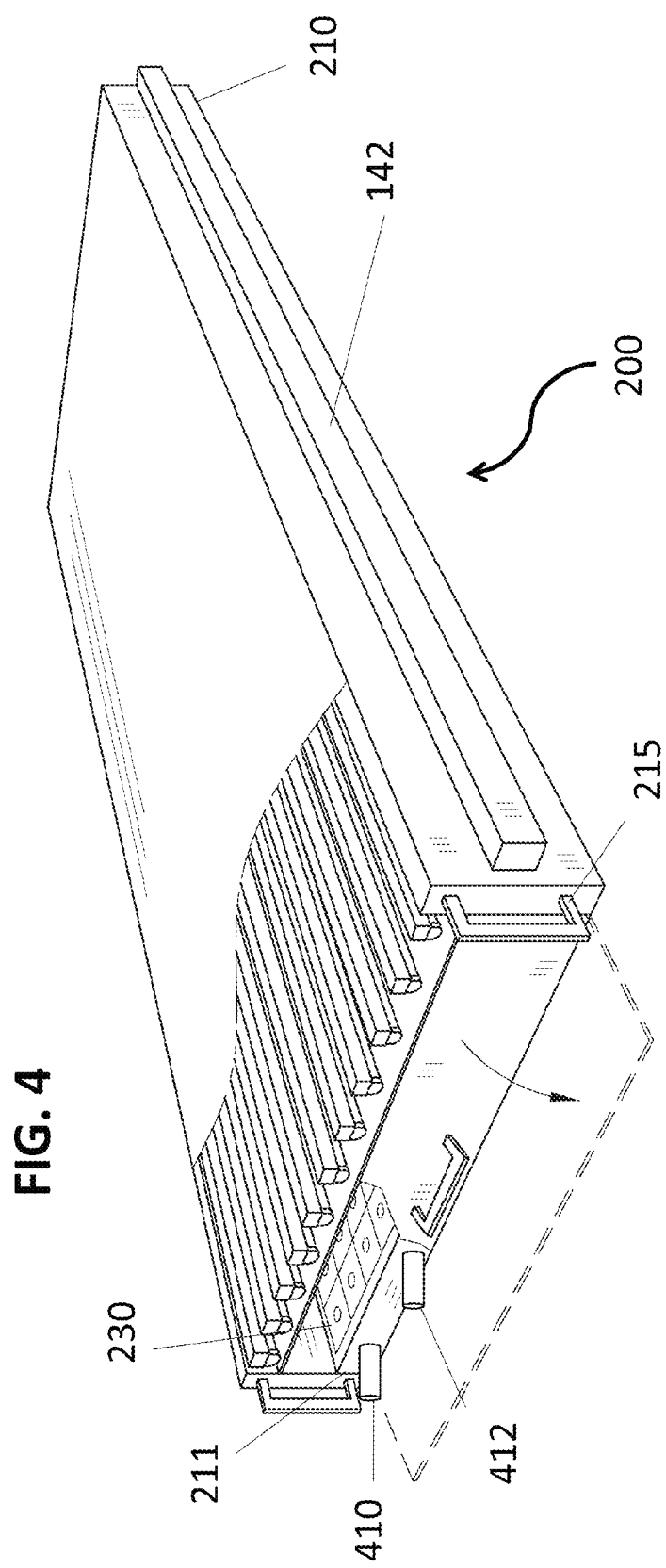
FIG. 4 is a perspective view of the growing module of the present invention showing the in/out connections for the irrigation system.
Figure 5:
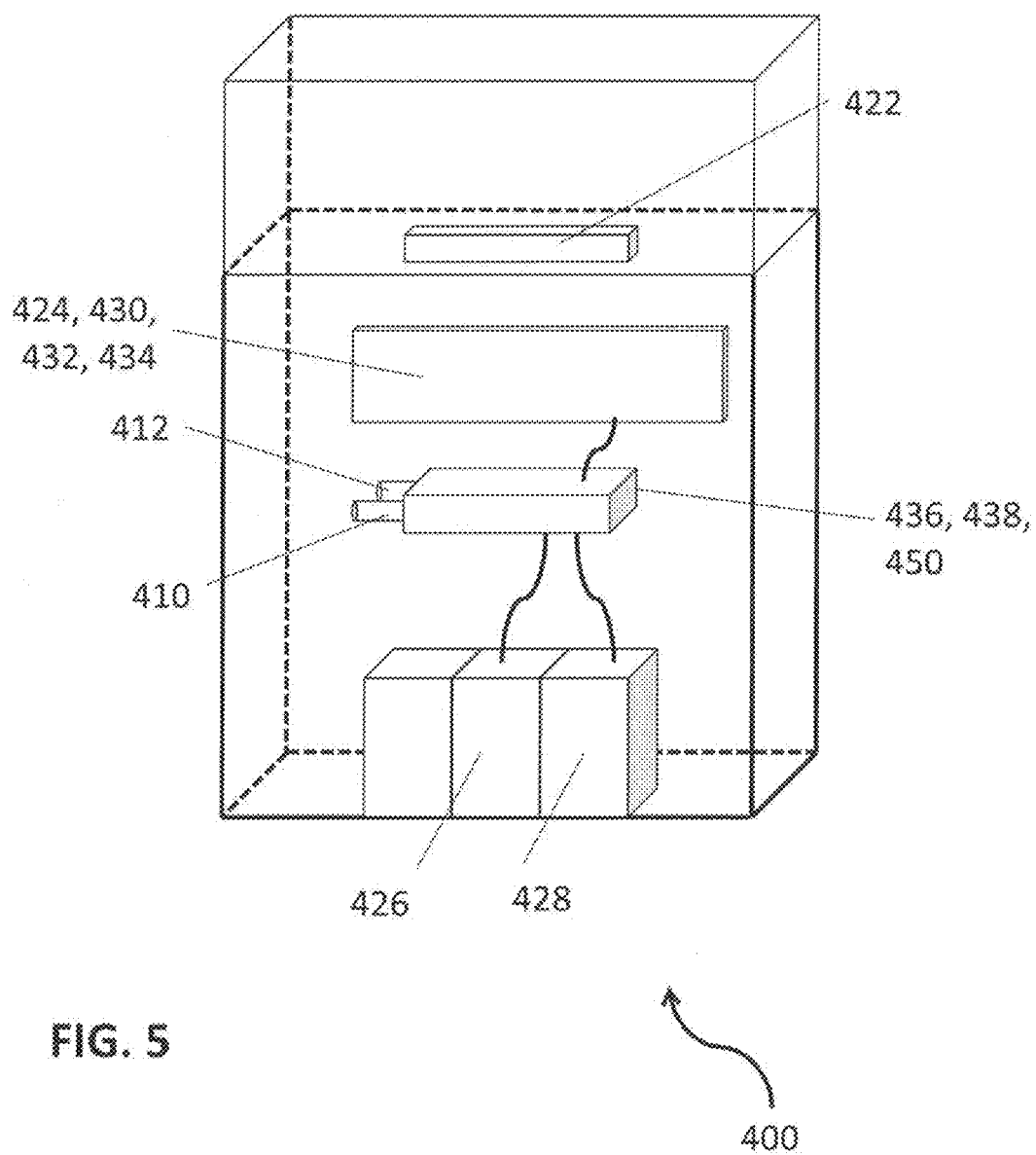
FIG. 5 shows components of the irrigation system.
Figure 6:
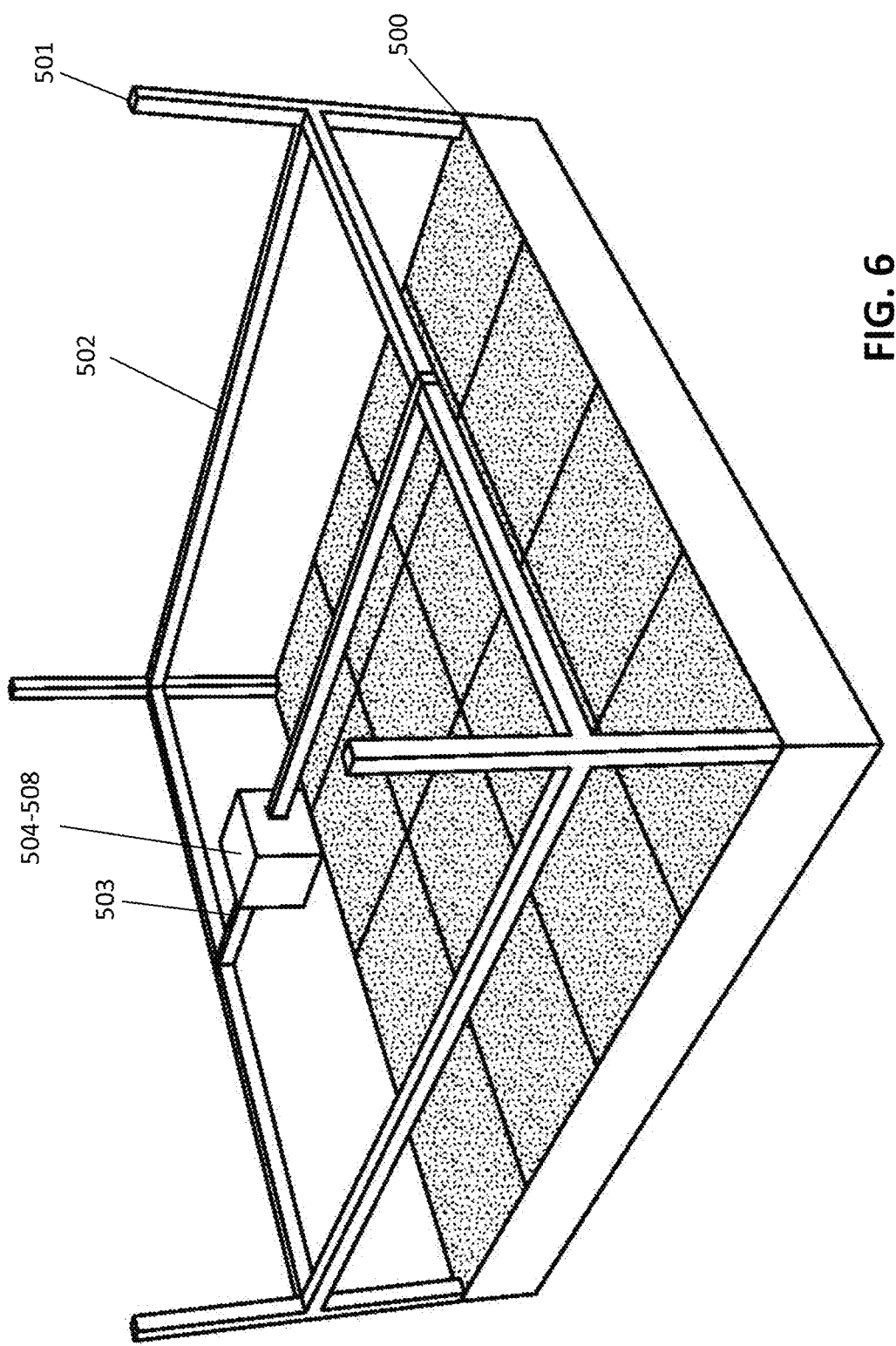
FIG. 6 shows the boom system of the present invention.

- 100 semi-automated production system
- 110 interior shell
- 112 side wall of interior shell
- 120 exterior shell
- 130 door
- 140 mounting component
- 142 mounting component flange
- 148 chemical-resistant liner (may also include insulation paint, foam, or a combination thereof; the chemical-resistant liner and/or insulation paint and/or foam may go on one or both of the interior of the insert and/or the containment structure, e.g., the outer shell)
- 151 window
- 152 weather station (the system may feature an intake for natural ventilation that connects to the weather station)
- 153 GPS tracking and communication component (e.g., remote system disablement)
- 154 computer control system
- 155 alternative energy system (e.g., a photovoltaic system, e.g., wind, Peltier pump)
- 200 growing module
- 210 growing module container
- 211 support structure for grid/cells (e.g., NFT, flood table, bucket, gutter, cable sleeve, slab, aero, stacked)
- 215 handle (for growing module container)
- 217 handle (for grid/cells)
- 220 grid
- 230 cells
- 300 lighting and airflow fixture (may include HID lamp and/or other source with containment and airflow)
- 310 lighting and airflow fixture housing
- 320 fan
- 330 light emitting diode (LED) assembly board
- 332 LED (or other light system such as OLED, etc.)
- 340 light diffuser
- 342 airflow orifices
- 350 adjustable airflow nozzle
- 400 internal irrigation system
- 410 connection to irrigation system (in)
- 412 connection to irrigation system (out)
- 422 air compressor
- 424 injector board (e.g., injector, filters, pressure gauge, inline sensor)
- 426 mixing tanks
- 428 stock nutrient tanks
- 430 particulate filters
- 432 inline sensor arrays (e.g., pH, EC, DO, T, TDS)
- 434 solenoids (e.g., fresh water, nutrient solution)
- 436 chiller
- 438 heat pump
- 450 sterilizing system
- 500 boom system
- 501 Z direction/axis
- 502 X/Y direction/axis
- 503 moveable boom
- 504 data acquisition system
- 505 camera
- 506 temperature sensor
- 507 relative humidity sensor
- 508 gas sensor Referring now to FIG. 1-6, the present invention features a self-contained semi-automated production system (100) for culturing plants and other organisms in a controlled environment. The system (100) may be used in a variety of environments including but not limited to farms, yards, fields, warehouses or buildings, and the like. The system (100) can be easily transported from one location to another (e.g., because of the size of the system (100) and exterior shell (120)), and the system can be used for culturing during transportation. A user can engage in activities such as seeding and harvesting (and manipulating and treating), and the system (100) of the present invention performs the necessary tasks for cultivating the plants or organisms. For example, the system (100) can control conditions including but not limited to light, temperature, relative humidity, carbon dioxide concentration, irrigation, and the like, via internal algorithms and programs. Without wishing to limit the present invention to any theory or mechanism, it is believed that the system (100) of the present invention is advantageous because little agricultural knowledge and experience is required of a user to grow (and manipulate) plants and organisms with this system (100). Also, since the system (100) is contained, production of plants, crops, and other organisms can occur continuously, independent of the external climate and conditions. In some embodiments, during transport of the system (100), the system (100) can be powered using common connections in rail cars, semi-trucks, and/or its own alternative energy system.

The system (100) of the present invention comprise a shell, for example an outer shell (120) and/or an inner shell (110). In some embodiments, the exterior shell (120) is similar to a shipping container, which is well known to one of ordinary skill in the art, however the exterior shell (120) is not limited to a shipping container. The exterior shell (120) may be constructed in a variety of sizes, for example sizes appropriate for small and large-scale use.

One or more access points (e.g., doors (130)) are disposed in the exterior shell (120). The shell (120) may further comprise a variety of other components, for example for providing strength and/or insulation (e.g., for helping to control the internal environmental conditions accurately). For example, the system (100), e.g., the shell (120), may comprise a chemical-resistant liner, paint, foam, gel, boards, fills, an anti-bacterial coating, etc., for helping to control the environmental conditions. In some embodiments, one or more windows (151) are disposed in the exterior shell (120). In some embodiments, ventilation ducts are disposed in the system (100), e.g., in the exterior shell (120). The system (100) may comprise one or more power sources. The power source, for example, may comprise an alternative energy-generating component (155) to create an off-grid or grid-tied system such as one or more photovoltaic panels (or wind, peltier, fuel cell, or other).

In some embodiments, insulating paint may be coated on the exterior shell (120). In some embodiments, insulating paint may be coated on the interior surface of both shells (110, 120). In some embodiments, one or both of the shells (110, 120) feature anti-bacterial coating. In some embodiments, the system (100) further comprises a GPS tracking and communications component (153) (e.g., remote system disablement, comms and control) and/or a computer control system (154). The GPS tracking and communications component (153) may allow for communication to/from the system (100), remote shutdown or system disablement, and/or locational tracking. The system (100) may also feature communication components, which allow for communication of information to and from the device. A weather station (152) may communicate external environmental information to and from the device for control. The weather station (152) feature a natural vent, power, crop readiness and storage.

The system (100) may comprise an interior shell (110), which may slide into the exterior shell (120). The interior shell (110) may provide additional insulation for the system (100) (e.g., resistance to entry/exit or heating or cooling), a chemical resistant barrier, and beams for securing internal structural components (e.g., providing additional strength to the system (100)), equipment, wiring, other devices, and the like. A chemical-resistant liner (148) (and/or an anti-microbial surface coating for protection may be on both the inside and outside of both the shells) may be disposed in the interior shell (110), allowing the unit to be effectively cleaned and sterilized in preparation for use or modification of the system without damaging the exterior shell (120). Various attachment or fitting components may be disposed on the outside of the interior shell (110), allowing the interior shell (110) to be slid or mounted into the exterior shell (120).

The present invention is not limited to a configuration with an exterior shell (120) and an interior shell (110). For example, in some embodiments, the system (100) comprises a single shell, and in some embodiments, the system (100) comprises a plurality of shells.

The system (100) further comprises one or more growing modules (200) (e.g., small isolated containment units). The interior shell (110) provides a means of mounting the growing modules (200) and other materials needed for the system (100). For example, mounting components (140) may be disposed on the inner surface (e.g., the side walls (112)) of the interior shell (110) for mounting growing modules (200), irrigation components, light components, and the like. The growing module (200), (e.g., the growing module container (210), may comprise one or more mounting component flanges (142) for slidably engaging the mounting components (140) of the interior shell (110). In some embodiments, one or more handles (215) are disposed on the growing modules (200) (e.g., on the growing module container (210)), allowing for easy sliding of the growing module (200) within the mounting components (140).

The system (100) creates micro-climates and treatments (e.g., with specific environmental parameters) inside the various growing modules (200) installed in the system (100). Each growing module (200) can be used to grow a specific plant or organism (or certain groups of plants or organisms), allowing the specific grown requirements of those plants or organisms to be met (or allowing experiments, storage, treatment, etc.). The artificial micro-climates created allows for growth of these plants and organisms in non-traditional environments such as buildings and other urban settings (and allows for experimentation). The growing modules (200) allow for efficient control of parameters such as temperature, light, humidity, carbon dioxide concentration, and the like, because the growing modules (200) have a small volume of space. The environmental parameters are also monitored via sensors for feedback control.

The growing module (200) may comprise a growing module container (210) and a grid (220) disposed inside the growing module container (210) (the grid (220) may be mounted on a support structure (211) (or may be independently standing) in the growing module container (210). The grid (220) comprises a plurality of cells (230), each adapted to hold a plant. In some embodiments, the grid (220) is accessible via an opening access disposed in the growing module container (210). In some embodiments, the opening access is positioned in a top surface of the growing module container (210). In some embodiments, the opening access is positioned in a side surface of the growing module container (210). The growing module containers (210) may be freely exposed, e.g., the growing module containers (210) may not necessarily be incorporated into a shell.

In some embodiments, the growing module (200) may be removable and stackable. The modules (200) may be independently controlled and maintained in the system (100).

The system (100) of the present invention may feature an XYZ coordinate boom system (500), e.g., a data collection and culturing device. The boom system (500) may or may not be featured in each growing module (as a component or an add-on over and/or around the culture area) or be mounted to the interior of the container (e.g., shell) or on a framework or around the culture area (e.g., when only a single plane of culturing organisms exists).

The boom system (500) may comprise a track along the X/Y direction (502) and Z direction (501), allowing for motorized movement along the axes. The boom system (500) may comprise a moveable boom (503) along the X/Y axes (502) with or without its own independent track that moves along the X or Y axes with or without air and/or water ducting to support standard horticultural functions and specialized treatments. The boom system (500) may comprise an irrigation/fertilizing system or components thereof, and/or air ducting or an air flow/vacuum creation device with orifices, and/or lighting system(s) and/or a means of gently contacting the organism (bristle brush or fiber or strips of metal (504)) attached to the moveable boom (503).

The boom system (500) may comprise a data acquisition system (504) comprising sensors and cameras (505, 506, 507, 508). Such sensors and cameras may be mounted or embedded onto the moveable boom (503) or mounted without the boom on the X/Y/Z tracks (501, 502), allowing for movement in all directions over the culturing area. The boom system (500), e.g., data acquisition system (504), may allow for processing, archiving, and feedback control. The data acquisition system (504) may comprise a camera (505) (e.g., color, video, thermographic, hyperspectral, etc.), a temperature sensor (506) (e.g., air and non-contact organism & culture area), a relative humidity sensor (507), and a gas sensor (508) (e.g., sample by vacuum on moving boom-IRGA). The data acquisition system (504), e.g., gas sensor (508), can help to monitor conditions such as Ethylene, VOX, NOX, and other gas.

The boom system (500), e.g., the boom (503) and/or the data acquisition system (504) may perform standard horticultural functions including but not limited to water, fertilizer application, pesticide application, and/or other chemical or biochemical treatments. In some embodiments, the boom system (100), e.g., the boom (503) and/or the data acquisition system (504) may perform additional functions including but not limited to (a) mechanical stimulation for rigidity and hardiness of the organism by contact with the movable boom (503) or by attached apparatus or materials of the data acquisition system (504) (e.g., bristles, metal), (b) direct air injection combined with carbon dioxide or other gas for pest control and growth management capability allowing for increased growth of certain organisms, (c) stimulation by air flow for rigidity and hardness and pest control by non-contact as means to avoid soiling instruments or spreading pathogens and/or pests, (d) moving lighting system mounted on the boom (503) or the data acquisition system (504), e.g., pulse lighting to apply treatments and/or to reduce electric power consumption, (e) special light treatments either in the data acquisition system (504) or mounted on the boom (503), e.g., application of UV, Far-red, and others to elicit morphological, biochemical, or physiological change within an organism, and (f) vacuum/filtration on the boom (503) or on the data acquisition system (504) of air, pest, particulate matter in the immediate culturing area minimizing disease, pest, and other pathogenic risks.

The boom system (500) may take information via sensors (e.g., air temperature, leaf temperature via laser, relative humidity, carbon dioxide, air pressure, etc.). In some embodiments, the boom features a camera for video or photo recording, infrared, thermal recording, photo archiving, etc. In some embodiments, a vacuum obtains air samples for processing by IRGA or other system to obtain photosynthetic rates and/or gas consumption or production. The boom system (500) allows for feedback of information to a connected system for a user, e.g., a controller/software, etc.

The system (100) may also be designed to provide the user information about the plant or organism as it progresses, either for educational purposes or to help the user to make decisions, e.g., to modify conditions or to harvest, etc. The ability to instantaneously adjust environmental settings based on what is occurring inside the growing area and regulates the immediate conditions of the aerial cultivation environment surrounding the organism allows for almost complete control of its culture and manipulation, modification, and/or response. Through the use of external weather stations, the system (100) may opt to utilize external conditions for heating and cooling the device (e.g., via a natural vent), as well as using data for acclimatizing plants to external conditions where and when appropriate (e.g., for plant storage, crop readiness, etc.). Usage of passive cooling and heating will increase the efficiency of the device and lower its power requirements.

Using lighting sources in the growing module such as, but not limited to solar collectors, LEDs (332), HID lamps, microwave plasma, redirected solar via fiber optics, and fluorescent lights, the culture and manipulation of plants and other organisms is made possible without use of sunlight. And, such light sources allow the system (100) to manipulate the light conditions as desired (e.g., alternative light cycles, radiation treatments for manipulating biochemical synthesis in organisms, higher nutrition or relevant chemical compound, etc.). Light diffusing panels (340) may be used to achieve uniform lighting throughout the growing module (200), while able to provide cooling and additional airflow (possibly directed) to the aerial portion of the growing environment. For example, the light diffusing panels (340) may be used to direct temperature controlled air with or without carbon dioxide. Overhead or horizontal airflow may provide the advantage of faster growth, breaking up of a boundary layer, or solving of other physiological issues. Additional heat generated by the light source may be separated by the diffusing panel (340) and then ventilated away from the growing environment. Removing excess heat reduces the load on the air conditioning units, creating a more efficient system.

Controlling the light output reaching the organism allows precise and accurate control and manipulation of the plant's/organism's development through exposure to specific wavelengths of light emitted including but not limited to UV, PAR, near IR, IR spectrum, far red, and/or other wavelengths outside the wavelengths commonly used in the field may be used (a spectrum similar to sunlight may be used, or special spectrums for special treatments may be used, etc.). Since the amount of light needed varies per plant/organism, the system (100) of the present invention integrates algorithms contained within the computer control systems. These algorithms and programs communicate with sensors inside the growing modules to control light intensity, duration, color, quality, and other factors to yield the desired type of growth or manipulation. This combination of automatic environmental control and sensing allows users to operate the device without prior knowledge of the plant's/organism's optimal conditions.

Computer control systems coupled with sensors monitor real-time parameters including but not limited to: air temperature (AT), solution temperature, RH (%), PAR (umol m-2 s-1), $CO_2$, dissolved oxygen, and other parameters, in addition to visual monitoring through camera and other imaging techniques. Communications between sensors and the computer control systems allow for automated control of the conditions required for growth of the selected organism based on pre-programmed set points so the user requires no prior experience or knowledge. Alternatively, a user may enter alternate parameters or set points. Integrating visual monitoring allows for pre-programmed decision software to completely control plant growth and reduces the user's interaction. The computer and other control systems allow remote monitoring, access, and control to be accomplished through terminals, computers, laptops, PDA's, and other communication devices. Remote access allows user interaction and troubleshooting to occur in a non-contact manner (e.g., low jack, kill switch), helping to eliminate disturbing of the production process.

The present invention also features lighting and airflow fixtures (300), which may be incorporated into a growing module (200). Each lighting and airflow fixture (300) comprises a housing (310), e.g., a cylindrical housing. A fan (320) is disposed in the housing (310) and is positioned to blow air downwardly (e.g., to a cell (230)). In some embodiments, the fan (320) is attached to the exterior of the housing (310), driving air in and then passing it through a porous diffusing panel. The lighting and airflow fixture (300) as shown in the figures positions the fan (320) at the top portion of the housing (310) and the bottom portion of the housing (310) is open to allow air flow to exit the housing (310).

A light emitting diode (LED) assembly board (330) comprising LEDs (332) (or other light system such as OLED, etc.) is disposed below the fan (320) in the housing (310). A light diffuser (340) is disposed below the LED assembly board (330), wherein the light diffuser (340) comprises airflow orifices (342). The light diffuser (340) is adapted to shape light passed to the cells (230) (e.g., a plant in a cell (230)).

An adjustable airflow nozzle (350) extends downwardly from fan (320) and protrudes through the LED assembly board (330) and the light diffuser (340). The light diffuser (340) may have a particular orifice shape on the diffusing panel, e.g., to elicit directional airflow either vertical, diagonal, horizontal, or somewhat horizontal). The adjustable airflow nozzle (350) provides directed air flow downwardly toward the bottom area of the housing (310). A plant (e.g., in a cell (230) in a grid (220) of a growing module (200)) may be positioned below the air flow.

In some embodiments, a plurality of lighting and airflow fixtures (300) is contained within a light and airflow "unit." In some embodiments, a light and airflow "unit" (e.g., a plurality of lighting and airflow fixtures (300)) is disposed in a growing module (200). For example, a plurality of light and airflow fixtures (300) may be positioned above the grid (220) and arranged such that each lighting and airflow fixture (300) is positioned above a cell (230) and air flow from the fan (320) and light from the LEDs (332) of the lighting and airflow fixture (300) is directed downwardly to its respective cell (230).

The growing module (200) and the lighting and airflow fixtures (300) are housed in a shell, e.g., the inner shell (110) and/or the outer shell (120). In some embodiments, the growing module (200) and the fixtures (300) are slidably inserted into a shell. In some embodiments, the growing module (200) and/or the fixtures (300) are free standing, hanging, or stacked.

The system (100) may further comprise an internal irrigation system (400) for controlled (and optionally continuous) recirculation of water (and/or nutrients). The irrigation system (400) may feature an inlet connection (410) and an outlet connection (412) to carry water to and from the growing module (200). The system (400) may allow for recirculation and recapturing of water with a condensation device. In some embodiments, the inlet connection (410) and the outlet connection (412) are disposed in the growing module container (210), e.g., the stabilizing structure (211). The inlet connection (410) and outlet connection (412) connect to the irrigation system (400), for example to a sterilizing system (450), a mixing tank (426), a nutrient tank (426), a particulate filter (430), a chiller (436), and/or a heat pump (438). In some embodiments, the irrigation system (400) comprises an injection board 424, an inline sensor array (432), solenoids (434), and/or an air compressor (422) and/or filters. In some embodiments, the system recaptures water with a condensate generation and recovery system, then water can be treated prior to recirculation. In some embodiments, condensation is collected from air conditioning and/or heat pumps and is subsequently treated prior to recirculation (e.g., if it is a stand-alone unit).

In some embodiments, water of the internal irrigation system (400) may be treated and/or sterilized via the sterilization system (450). The sterilization system (450) may feature sterilizing lamps, anti-microbial lights, ozone-generating systems, and/or chemical systems.

In some embodiments, the system (100) of the present invention further comprises a reverse osmosis system for filtering water. In some embodiments, the system (100) of the present invention further comprises peltier pumps for generation of a trickle charge on the exterior and/or interior of the shell(s) (110, 120). In some embodiments, the system (100) of the present invention further comprises pulse lighting (e.g., via LED) to reduce power consumption. In some embodiments, the system (100) of the present invention further comprises an irrigation system with load cells immediately underneath the cultivation module and other equipment. In some embodiments, the thermoelectric devices (Peltier pumps) are mounted to the surfaces of the shell(s). In some embodiments, the thermoelectric devices may be powered to cool/heat a surface and/or collect, store and use energy from waste heat (e.g., using heat generated on the exterior surface by solar radiation).

In some embodiments, the system (100) of the present invention further comprises a heated/cooled growing tray or an insert coated in resin or anti-microbial material. In some embodiments, the system (100) further comprises LED/OLED lights embedded for intercanopy lighting. In some embodiments, the system (100) is impregnated with silver ion.

In some embodiments, the system (100) of the present invention further comprises a water recapture system with a condensation unit or an air conditioning unit and filter. In some embodiments, the system (100) of the present invention further comprises mobile shelving for space utilization (the mobile shelving may or may not be motorized). In some embodiments, the system (100) of the present invention further comprises biological and/or chemical and/or biochemical carbon dioxide generation using fungal, bacteria, chemical or biochemical reactions.

In some embodiments, the system (100) of the present invention further comprises intercanopy and/or intracanopy light ropes or a woven light curtain or blanket. In some embodiments, the system (100) further comprises waterproof endcaps to allow for healing and high humid environment. In some embodiments, the system (100) further comprises a fog system and ultrasonic mist system for sterilization, pest/virus/bacteria/"pre-entry" control and/or humidity control.

The present invention also features a growing plane system. The growing plane system (like the boom system (500)) may be stand-alone devices, or the growing plane system (600) (like the boom system (500)) may be incorporated in other components and/or systems described herein.

In some embodiments, the growing plane system may help control and provide optimal temperature via an energized wire element and/or a thermo-electric device (e.g., a peltier-type thermoelectric device). In some embodiments, the growing plane system may deliver light (e.g., via a lighting system (optionally surface-mounted/embedded)), e.g., away from the surface in the culturing area, diffused in the coating/covering, or elsewhere. In some embodiments, the growing plane system may provide a growing surface in immediate contact with the culturing area that is water and chemical resistant and resistant to bacterial, microbial, virus, fungal, and/or other biologic system(s).

The growing plane system may comprise a mounting surface, which may be lightweight, rigid, semi-rigid, and/or flexible. The growing plane system may further comprise a series of thermo-electric devices, e.g., surface-mounted, peltier type. The growing plane system may further comprise a wire-type energized element (e.g., surface-mounted).

The growing plane system may further comprise a surface mounted lighting system, e.g., a surface-mounted lighting system. The lighting system may provide specific wavelengths of light. The lighting system may work in combination with the coating/cover (coating/cover described below). The lighting system may allow a user to provide lighting to the culture area. For example, the lighting system may provide intercanopy and/or intracanopy lighting for replacement of light, supplementation, or treatments in the culture of photosynthetic organisms.

The growing plane system may further comprise clear or opaque or diffusers (e.g., for distributing light evenly).

The growing plane system may further comprise a coating (or cover). In some embodiments, the coating is chemically resistant and/or waterproof. In some embodiments, the coating is impregnated with anti-microbial/viral/bacterial element, e.g., elemental silver (silver ions). In some embodiments, the coating is impregnated with photo catalytic coatings and/or other elemental-type chemical formulations (such as commercial product OxiTitan featuring formulations of zinc and/or titanium and/or silicon-based molecules). The coating may be operatively (e.g., electrically) connected to the main system via lead wires.

The coating may be layered. The coating may provide protection for the electric components against moisture (reducing electrocution risk, etc.) and allowing for submerged or moist condition operation. The coating may diffuse light from the lighting systems (which may or may not be embedded) so as to achieve uniform lighting conditions. The coating may provide protection against pathogens, e.g., via the composition of the coating.

The growing plane system may further comprise a thermo-electric device. The thermo-electric device may allow for heating or cooling of the area. This may allow for a user to provide an environment for plant culture that may suppress some temperature-sensitive pathogens, reducing the need for standard pathogenic control. The thermo-electric device may allow for culturing in less-than-optimal conditions, allowing a user to consume less electric energy in the form of aerial environment conditioning and therefore reduce production costs. In some embodiments, the control of irrigation and data collection is via load cell.

The growing plane system may provide standard horticultural functions enabling the user to control root zone or culture zone temperature to provide optimal culturing conditions during phases such as germination as a propagation mat would.

The following the disclosures of the following U.S. Patents are incorporated in their entirety by reference herein: U.S. Pat. No. 2008/0295400.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the invention.

What is claimed is:

1. A semi-automated crop production system (100) comprising:
   (a) a growing module (200) comprising a growing module container (210), a grid (220) disposed inside the growing module container (210), the grid (220) comprises a plurality of cells (230) adapted to hold a plant; and
   (b) a plurality of lighting and airflow fixtures (300) disposed inside the growing module container (210) and positioned above the grid (220), each lighting and airflow fixture (300) comprises: a housing (310); a fan (320) disposed in the housing (310) and positioned to blow air downwardly; a light emitting diode (LED) assembly board (330) comprising LEDs (332) disposed below the fan (320) in the housing (310); a light diffuser (340) disposed below the LED assembly board (330), the light diffuser (340) comprises airflow orifices (342); and an adjustable airflow nozzle (350) extending downwardly from the fan (320) and protruding through the LED assembly board (330) and the light diffuser (340), the adjustable airflow nozzle (350) provides directed air flow downwardly toward a bottom area of the housing (310), wherein the plurality of lighting and airflow fixtures (300) are arranged such that each lighting and airflow fixture (300) is positioned above a cell (230) and air flow from the fan (320) and light from the LEDs (332) of the lighting and airflow fixture (30) is directed downwardly towards its respective cell (230);
wherein the growing module slidably engages a mounting component (140) disposed in a wall of an interior shell (110).

2. The semi-automated crop production system (100) of claim 1, wherein the mounting component (140) is disposed in a side wall (112) of the interior shell (110).

3. The semi-automated crop production system (100) of claim 1, wherein a mounting component flange (142) is disposed on the growing module container (210), the mounting component flange (142) slidably engages the mounting component (140) of the shell (110).

4. The semi-automated crop production system (100) of claim 1, wherein the interior shell (110) is slidably disposed in an exterior shell (120).

5. The semi-automated crop production system (100) of claim 1 further comprising a boom system (500), the boom system (500) comprises an X/Y track (502) along an X/Y direction and a Z track (501) along a Z direction, and a moveable boom (503) that can move along the X/Y direction (502) and the Z direction (501), the boom system (500) provides a horticultural function.

6. The semi-automated crop production system (100) of claim 5, wherein the horticultural function comprises irrigation, fertilization, air ducting, vacuum creation, lighting, or contacting.

7. The semi-automated crop production system (100) of claim 5, wherein the boom system (500) further comprises a data acquisition system (504) comprising sensors and cameras, the sensors and cameras are mounted on the moveable boom (503) or on the X/Y track (502) or Z track (501).

8. A semi-automated crop production system (100) comprising:
   (a) a growing module (200) comprising a growing module container (210), a grid (220) disposed inside the growing module container (210), the grid (220) comprises a plurality of cells (230) adapted to hold a plant;
   (b) an internal irrigation system (400) for continuous recirculation of water through the growing module (200), the internal irrigation system (400) connects to an inlet connection (410) and an outlet connection (420) disposed in the growing module container (210); and
   (c) a plurality of lighting and airflow fixtures (300) disposed inside the growing module container (210) and positioned above the grid (220), each lighting and airflow fixture (300) comprises: a housing (310); a fan (320) disposed in the housing (310) and positioned to blow air downwardly; a light emitting diode (LED) assembly board (330) comprising LEDs (332) disposed below the fan (320) in the housing (310); a light diffuser (340) disposed below the LED assembly board (330), the light diffuser (340) comprises airflow orifices (342); and an adjustable airflow nozzle (350) extending downwardly from the fan (320) and protruding through the LED assembly board (330) and the light diffuser (340), the adjustable airflow nozzle (350) provides directed air flow downwardly toward a bottom area of the housing (310), wherein the plurality of lighting and airflow fixtures (300) are arranged such that each lighting and airflow fixture (300) is positioned above a cell (230) and air flow from the fan (320) and light from the LEDs (332) of the lighting and airflow fixture (30) is directed downwardly towards its respective cell (230);
wherein the growing module (200), irrigation system (400), and lighting and airflow fixtures (300) are housed in a shell (110).

9. The semi-automated crop production system (100) of claim 8 further comprising a sterilizing system (450) for sterilizing water of the internal irrigation system (400).

10. The semi-automated crop production system (100) of claim 9, wherein the sterilizing system (450) comprises a sterilizing lamp, an anti-microbial light, a chemical system, an ultraviolet light system, or an ozone-generating system.

11. The semi-automated crop production system (100) of claim 8 further comprising a boom system (500), the boom system (500) comprises an X/Y track (502) along an X/Y direction and a Z track (501) along a Z direction, and a moveable boom (503) that can move along the X/Y direction (502) and the Z direction (501), the boom system (500) provides a horticultural function.

12. The semi-automated crop production system (100) of claim 11, wherein the horticultural function comprises irrigation, fertilization, air ducting, vacuum creation, lighting, or contacting.

13. The semi-automated crop production system (100) of claim 11, wherein the boom system (500) further comprises a data acquisition system (504) comprising sensors and cameras, the sensors and cameras are mounted on the moveable boom (503) or on the X/Y track (502) or Z track (501).

* * * * *